(12) United States Patent
Sakai et al.

(10) Patent No.: US 12,174,774 B2
(45) Date of Patent: Dec. 24, 2024

(54) SELECTION DEVICE AND SELECTION METHOD

(71) Applicant: FANUC CORPORATION, Yamanashi (JP)

(72) Inventors: Koujirou Sakai, Yamanashi-ken (JP); Hironao Tanouchi, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 20 days.

(21) Appl. No.: 18/246,050

(22) PCT Filed: Sep. 22, 2021

(86) PCT No.: PCT/JP2021/034670
§ 371 (c)(1),
(2) Date: Mar. 21, 2023

(87) PCT Pub. No.: WO2022/065325
PCT Pub. Date: Mar. 31, 2022

(65) Prior Publication Data
US 2023/0367732 A1 Nov. 16, 2023

(30) Foreign Application Priority Data
Sep. 28, 2020 (JP) .................... 2020-162441

(51) Int. Cl.
*G06F 13/00* (2006.01)
*G06F 1/16* (2006.01)
(Continued)

(52) U.S. Cl.
CPC ........ *G06F 13/4068* (2013.01); *G06F 1/1601* (2013.01); *G06F 3/0482* (2013.01)

(58) Field of Classification Search
CPC ............... G06F 13/4068; G06F 1/1601; G06F 3/0482; H02P 27/06
See application file for complete search history.

(56) References Cited

U.S. PATENT DOCUMENTS

| | | | |
|---|---|---|---|
| 7,219,272 B2 * | 5/2007 | Osada ................ | G11C 29/848 365/201 |
| 2004/0160206 A1 * | 8/2004 | Komaki ............... | G05B 19/408 318/569 |

(Continued)

FOREIGN PATENT DOCUMENTS

| JP | 2018207692 A | 12/2018 |
|---|---|---|
| JP | 2020054104 A | 4/2020 |

OTHER PUBLICATIONS

International Search Report issued by the Japanese Patent Office acting as the International Searching Authority in relation to International Application No. PCT/JP2021/034670 dated Nov. 22, 2021 (3 pages) along with English language translation (2 pages).

(Continued)

*Primary Examiner* — Henry Tsai
*Assistant Examiner* — Kim T Huynh
(74) *Attorney, Agent, or Firm* — Robert P. Michal, Esq.; Carter, DeLuca & Farrell LLP

(57) ABSTRACT

A selection device includes: a storage unit storing a plurality of types of amplifiers in advance; an acquisition unit for acquiring a plurality of selected amplifiers selected for driving a plurality of designated motors designated in advance; an alignment order selection unit for selecting a predetermined arrangement order in which the plurality of selected amplifiers are arranged adjacent to each other in the width direction on the basis of the types of the plurality of selected amplifiers; and a display control unit for causing a display unit to display the predetermined arrangement order.

16 Claims, 13 Drawing Sheets

(51) Int. Cl.
*G06F 13/40* (2006.01)
*G06F 3/0482* (2013.01)

(56) References Cited

U.S. PATENT DOCUMENTS

| 2005/0267625 | A1* | 12/2005 | Kurakake | G05B 19/4142 |
| | | | | 700/177 |
| 2009/0033412 | A1* | 2/2009 | Suyama | H04R 29/007 |
| | | | | 330/2 |
| 2009/0195206 | A1* | 8/2009 | Aoyama | G05B 19/414 |
| | | | | 318/600 |

OTHER PUBLICATIONS

Written Opinion of the International Searching Authority issued by the Japanese Patent Office acting as the International Searching Authority in relation to International Application No. PCT/JP2021/034670 dated Nov. 22, 2021 (3 pages).

* cited by examiner

| BUS BAR NAME (TYPE) | DIMENSIONS (mm) | | CONNECTION SOURCE (AMPLIFIERS) | CONNECTION DESTINATION (AMPLIFIERS) |
|---|---|---|---|---|
| BUS BAR 12A | LENGTH | 60 | AMPLIFIER HAVING WIDTHWISE LENGTH OF 60 mm | UNSPECIFIED |
| | WIDTH | 14 | | |
| BUS BAR 12B | LENGTH | 90 | AMPLIFIER HAVING WIDTHWISE LENGTH OF 90 mm | UNSPECIFIED |
| | WIDTH | 14 | | |
| BUS BAR 12C | LENGTH | 150 | AMPLIFIER HAVING WIDTHWISE LENGTH OF 150 mm | OTHER THAN AMPLIFIER HAVING WIDTHWISE LENGTH OF 300 mm |
| | WIDTH | 14 | | |
| BUS BAR 12D | LENGTH | 180 | AMPLIFIER HAVING WIDTHWISE LENGTH OF 180 mm | OTHER THAN AMPLIFIER HAVING WIDTHWISE LENGTH OF 300 mm |
| | WIDTH | 14 | | |
| BUS BAR 12E | LENGTH | 260 | AMPLIFIER HAVING WIDTHWISE LENGTH OF 260 mm | OTHER THAN AMPLIFIER HAVING WIDTHWISE LENGTH OF 300 mm |
| | WIDTH | 14 | | |
| BUS BAR 12F | LENGTH | 150 | AMPLIFIER HAVING WIDTHWISE LENGTH OF 150 mm | AMPLIFIER HAVING WIDTHWISE LENGTH OF 300 mm |
| | WIDTH | 15 | | |
| BUS BAR 12G | LENGTH | 300 | AMPLIFIER HAVING WIDTHWISE LENGTH OF 300 mm | OTHER THAN AMPLIFIER HAVING WIDTHWISE LENGTH OF 300 mm |
| | WIDTH | 15 | | |
| BUS BAR 12H | LENGTH | 150 | AMPLIFIER HAVING WIDTHWISE LENGTH OF 300 mm | AMPLIFIER HAVING WIDTHWISE LENGTH OF 300 mm |
| | WIDTH | 25 | | |

FIG. 5
32

| AMPLIFIER NAME (TYPE) | WIDTHWISE LENGTH (mm) | RATED CURRENT (A) |
|---|---|---|
| AMPLIFIER 14A | 60 | 20 |
| AMPLIFIER 14B | 90 | 40 |
| AMPLIFIER 14C | 150 | 80 |
| AMPLIFIER 14D | 180 | 100 |
| AMPLIFIER 14E | 260 | 150 |
| AMPLIFIER 14F | 300 | 200 |

FIG. 11                                54

| MOTOR NAME (TYPE) | RATED CURRENT (A) |
|---|---|
| MOTOR 16A | 20 |
| MOTOR 16B | 40 |
| MOTOR 16C | 80 |
| MOTOR 16D | 100 |
| MOTOR 16E | 150 |
| MOTOR 16F | 200 |

FIG. 12A                                        54

| MOTOR NAME (TYPE) | RATED CURRENT (A) | CABLE DIAMETER OF MOTOR CABLE (AWG STANDARD) |
|---|---|---|
| MOTOR 16A | 20 | AWG14 |
| MOTOR 16B | 40 | AWG14 |
| MOTOR 16C | 80 | AWG8 |
| MOTOR 16D | 100 | AWG8 |
| MOTOR 16E | 150 | AWG6 |
| MOTOR 16F | 200 | AWG6 |

FIG. 12B                    62

| CABLE NAME (TYPE) | CABLE DIAMETER (AWG STANDARD) |
|---|---|
| CABLE A | AWG14 |
| CABLE B | AWG8 |
| CABLE C | AWG6 |

SELECTION DEVICE AND SELECTION METHOD

CROSS-REFERENCE TO RELATED APPLICATIONS

This application is a national phase entry under 35 U.S.C. 371 of PCT International Application No. PCT/JP2021/034670, filed Sep. 22, 2021, which claims priority to Japanese Patent Application No. 2020-162441, filed Sep. 28, 2020, the disclosure of each of these applications is expressly incorporated herein by reference in their entirety.

TECHNICAL FIELD

The present invention relates to a selection device and a selection method for selecting accessories necessary for connecting a plurality of servo amplifiers by wiring.

BACKGROUND ART

As disclosed in JP 2020-054104 A, in the field of motors, a selection device is known which, on the basis of predetermined information that is input, selects an amplifier in order to cause a motor to be driven.

Further, J P 2020-054104 A discloses that, in wiring connection of amplifier, a plurality of amplifiers are electrically connected.

SUMMARY OF THE INVENTION

Accessories are connected to the amplifiers. As the accessories, for example, there may be cited bus bars that electrically connect the plurality of the amplifiers together, or alternatively, cables for amplifiers. In this instance, there may be cases in which types of the accessories such as the bus bars may change depending on the order in which the amplifiers are arranged alongside one another. By appropriately determining the order in which the plurality of the amplifiers are arranged alongside one another, the cost of the wiring configuration including the plurality of the amplifiers and the accessories can be reduced. Further, by appropriately determining the order in which the plurality of the amplifiers are arranged alongside one another, the wiring configuration becomes compact. However, in JP 2020-054104 A, a technique is not disclosed in order to appropriately determine the order in which the plurality of the amplifiers are arranged alongside one another. It is noted that there may also be cases in which the accessories are connected to the motors.

Thus, the present invention has the object of providing a selection device and a selection method for appropriately selecting the order in which a plurality of amplifiers are arranged alongside one another.

A first aspect of the present invention is characterized by a selection device, including a storage unit configured to store in advance a plurality of types of amplifiers, an acquisition unit configured to acquire a plurality of selected amplifiers which are selected in order to drive a plurality of designated motors that have been designated in advance, an alongside arrangement order selection unit configured to select a predetermined arrangement order in which the plurality of the selected amplifiers are arranged adjacent to each other in a widthwise direction, based on a type of the plurality of the selected amplifiers, and a display control unit configured to cause the predetermined arrangement order to be displayed on a display unit.

A second aspect of the present invention is characterized by a selection method, including a storage step of storing a plurality of types of amplifiers, an acquisition step of acquiring a plurality of selected amplifiers which are selected in order to drive a plurality of designated motors that have been designated in advance, an alongside arrangement order selection step of selecting a predetermined arrangement order in which the plurality of the selected amplifiers are arranged adjacent to each other in a widthwise direction, based on a type of the plurality of the selected amplifiers which is stored in the storage step, and a display step of causing the predetermined arrangement order to be displayed on a display unit.

According to the aspects of the present invention, the selection device and the selection method are provided for appropriately selecting the order in which the plurality of the amplifiers are arranged alongside one another.

BRIEF DESCRIPTION OF DRAWINGS

FIG. 4 is an exemplary configuration of a first table that is stored in a storage unit;

FIG. 5 is an exemplary configuration of a second table that is stored in a storage unit;

FIG. 11 is a diagram showing an exemplary configuration of a third table;

FIG. 12A is a diagram showing an exemplary configuration of the third table according to an Exemplary Modification 4;

FIG. 12B is a diagram showing an exemplary configuration of a fourth table according to the Exemplary Modification 4.

DETAILED DESCRIPTION OF THE INVENTION

A preferred embodiment in relation to a selection device and a selection method according to the present invention will be presented and described in detail below with reference to the accompanying drawings.

[Embodiment]

Prior to describing the selection device 10 and the selection method, in order to facilitate understanding, a preliminary explanation will be provided of points to be considered in relation to determining an order in which amplifiers 14 are arranged alongside one another. In the following description, a case in which bus bars 12 are used as an accessory will be presented as an example.

Figure 1A:
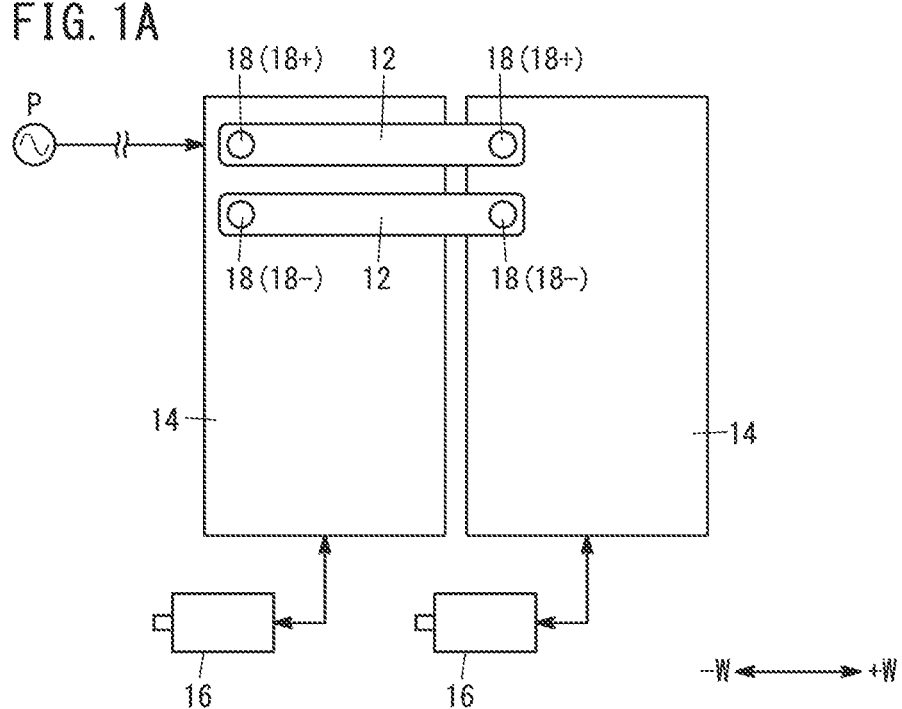
FIG. 1A is a schematic diagram illustrating two amplifiers connected by a bus bar.

FIG. 1A is a schematic diagram illustrating two of the amplifiers 14 which are connected by the bus bars 12.

The bus bars 12 are members which are used in order to electrically connect a plurality of the amplifiers 14 to each other. The bus bars 12 are one of the accessories in the present embodiment. In relation to the bus bars 12, as will be described later, there are a plurality of types thereof having at least different lengths or different widths. Moreover, accessories other than the bus bars 12 will be discussed later in relation to exemplary modifications.

The amplifiers 14 are driving devices for the motors 16 that supply current to the motors 16. Moreover, it should be noted that the amplifiers 14 of the present embodiment include a converter and an inverter. However, in the following description, unless otherwise specified, the converter and the inverter are not distinguished from each other.

A line indicating a widthwise direction (a +W direction and a −W direction) is shown in FIG. 1A. The +W direction in FIG. 1A is one direction along such a line. The −W direction in FIG. 1A is an opposite direction to the +W direction. Moreover, in the drawings other than FIG. 1A, it should be noted that the widthwise direction is illustrated only as necessary. The amplifiers 14 include connecting portions 18 (refer to FIG. 1A). The connecting portions 18 serve as electrical power connecting portions that are connected to the bus bars 12. Each amplifier 14 is provided with two connecting portions 18. The two connecting portions 18 have a connecting portion 18+ on a positive electrode side and a connecting portion 18− on a negative electrode side. The amplifiers 14 each have a surface (front surface) on which the two connecting portions 18 are provided. The two connecting portions 18 are disposed at predetermined positions on the front surface of each amplifier 14. The two connecting portions 18 are provided at positions, on the front surface of the amplifier 14, that are separated by a predetermined distance from an end in the −W direction along the widthwise direction of the amplifier 14. Further, each of the connecting portions 18+ is provided at a position, on the front surface of the amplifier 14, that is separated by a predetermined distance from the upper end along the heightwise direction of the amplifier 14. Each of the connecting portions 18− as well is provided at a position, on the front surface of the amplifier 14, that is separated by a predetermined distance from the upper end along the heightwise direction of the amplifier 14. However, the position in the heightwise direction of the connecting portions 18+ and the position in the heightwise direction of the connecting portions 18− are different from each other. In the illustration of FIG. 1A, the connecting portions 18+ are positioned more upwardly than the connecting portions 18−. However, the connecting portions 18− may be positioned more upwardly than the connecting portions 18+.

Figure 1B:
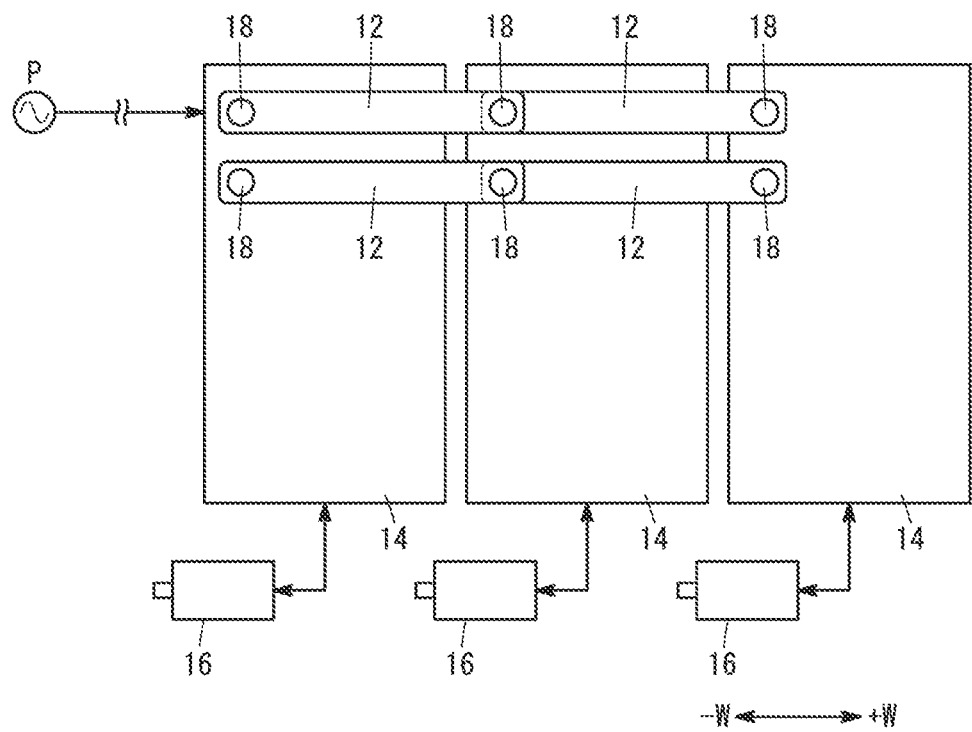
FIG. 1B is a schematic diagram illustrating three amplifiers connected by a bus bar.

Moreover, as shown in FIGS. 1A and 1B, according to the present embodiment, it is assumed that the connecting portions 18 are disposed in close proximity to the ends in the −W direction on the amplifiers 14. However, the connecting portions 18 may also be disposed in close proximity to the ends in the +W direction on the amplifiers 14.

The front surfaces of the plurality of the amplifiers 14 face in the same direction (refer to FIG. 1A). For the sake of convenience, the amplifier 14 on the side in the −W direction, of the two amplifiers 14 that are adjacent to each other in the widthwise direction and are connected by the same bus bars 12, is simply referred to as a "connection source". For the same reason, the amplifier 14 on the side in the +W direction, of the two amplifiers 14, is simply referred to as a "connection destination". According to the present embodiment, the connecting portions 18 are disposed at positions in close proximity to the end in the −W direction on the front surface of each of the amplifiers 14. Therefore, the bus bars 12 traverse across the connection source in the widthwise direction (refer to FIG. 1A).

The two bus bars 12 are connected to the two connecting portions 18 of each of the connection source and the connection destination. Owing to this feature, the connection source and the connection destination are connected to each other. In the present embodiment, two of the bus bars 12 are used to connect two of the amplifiers 14. One of the two bus bars 12 connects the connecting portions 18+ of the two amplifiers 14 to each other. The other one of the two bus bars 12 connects the connecting portions 18− of the two amplifiers 14 to each other. In this state, the connection source (the converter) and a power source P are connected. Consequently, electric current becomes capable of being supplied from the power source P to the connection source. The current from the connection source (the converter) is supplied via the two bus bars 12 to the connection destination (the inverter).

FIG. 1B is a schematic diagram illustrating three of the amplifiers 14 which are connected by the bus bars 12.

Although the number of the amplifiers 14 is two in the example shown in FIG. 1A, the number of the amplifiers 14 may be greater than or equal to three. For example, as shown in FIG. 1B, three of the amplifiers 14 are arranged alongside one another in the widthwise direction. Among the three amplifiers 14, an amplifier 14 positioned on the −W direction side and a centrally located amplifier 14 are connected to each other by the bus bars 12. Further, among the three amplifiers 14, the centrally located amplifier 14 and an amplifier 14 positioned on the +W direction side are connected to each other by the other bus bars 12. In the relationship between the centrally located amplifier 14 and the amplifier 14 positioned closer to the −W direction side than the centrally located amplifier 14, the amplifier 14 positioned on the −W direction side is the connection source of the bus bars 12. Further, in this relationship, the centrally located amplifier 14 is the connection destination of the bus bars 12. Further, in the relationship between the centrally located amplifier 14 and the amplifier 14 positioned closer to the +W direction side than the centrally located amplifier 14, the centrally located amplifier 14 is the connection source of the bus bars 12. Further, in this relationship, the amplifier 14 positioned on the +W direction side is the connection destination of the bus bars 12.

In the case that the plurality of the amplifiers 14 are connected by the bus bars 12, the appropriate bus bars 12 differ depending on the order in which the plurality of the amplifiers 14 are arranged alongside one another. Concerning the amplifiers 14, there exists a plurality of types thereof having at least different widthwise lengths (i.e., different lengths in the widthwise direction). As noted previously, the bus bars 12 traverse across the connection source in the widthwise direction. Accordingly, the length of the bus bars 12 must be at least long enough to reach from the connecting portions 18 at the connection source, traversing across the connection source in the widthwise direction, to the connecting portions 18 at the connection destination. However, from the standpoint of realizing the connection of the plurality of the amplifiers 14 insofar as possible in a compact configuration, it is not preferable to use bus bars 12 whose length is excessively longer than the distance between the two connecting portions 18. Further, there is a tendency for the bus bars 12 of a larger size and scale to be more expensive than the bus bars 12 of a smaller size and scale. Accordingly, the bus bars 12 of the larger size and scale become higher in cost than the bus bars 12 of the smaller size and scale. For this reason, when selecting the bus bars 12, it is preferable to select the bus bars 12 having a minimum required length necessary to enable the connection between the connecting portions 18 at the connection source and the connecting portions 18 at the connection destination.

Figure 2:
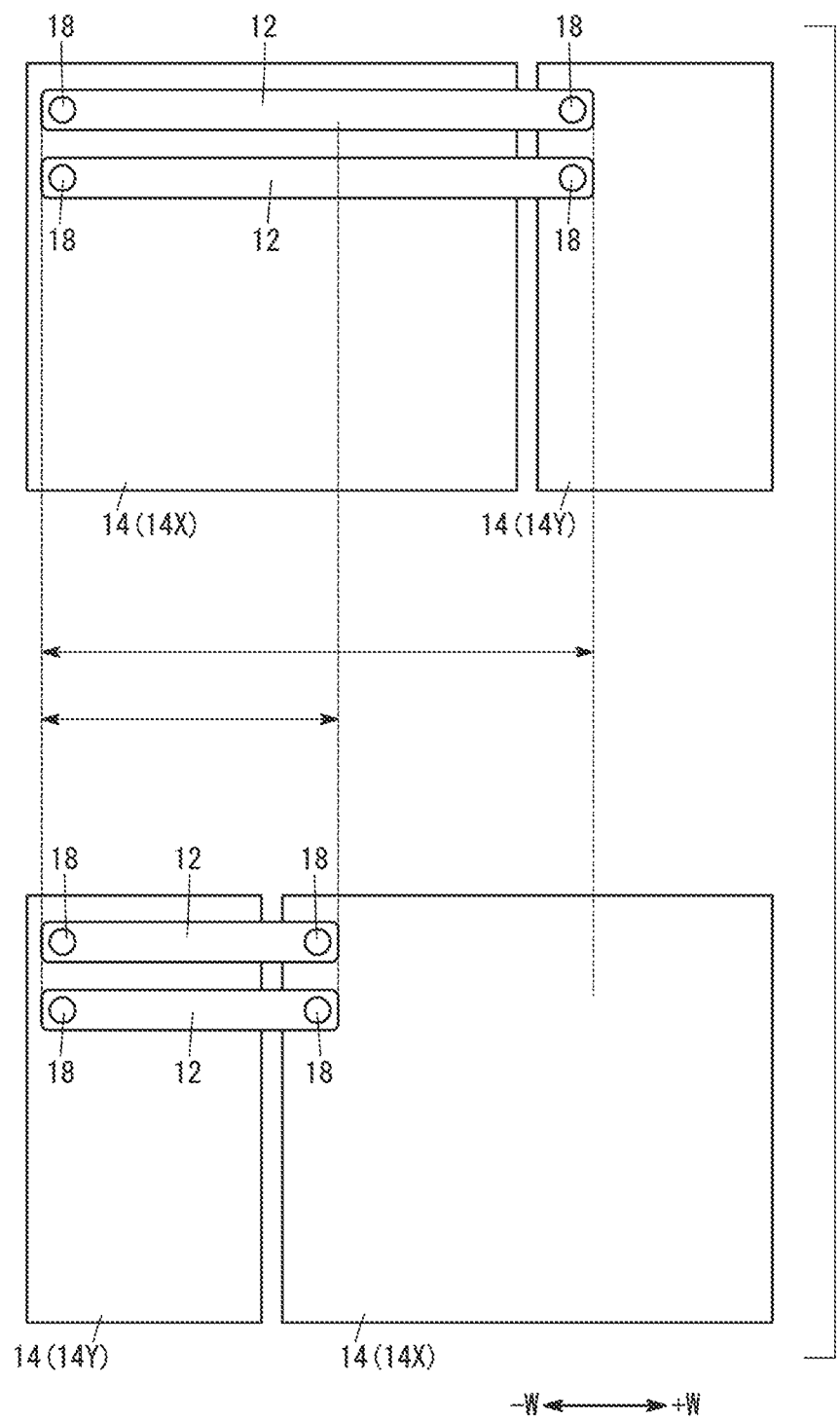
FIG. 2 is a schematic diagram illustrating how the types of the bus bars change in accordance with an order in which the amplifiers are arranged alongside one another.

FIG. 2 is a schematic diagram illustrating how the types of the bus bars 12 change in accordance with the order in which the amplifiers 14 are arranged alongside one another.

There may be cases in which the widthwise lengths (i.e., the lengths in the widthwise direction) of the plurality of the amplifiers 14 differ from each other. In this case, the minimum length of the bus bars 12 that are capable of connecting the connecting portions 18 at the connection source and the connecting portions 18 at the connection destination changes depending on the order in which the plurality of the amplifiers 14 are arranged alongside one another. A specific example thereof is shown in FIG. 2. In each of the upper side and the lower side in FIG. 2, there are illustrated a pair of two of the amplifiers 14 (an amplifier 14X and an amplifier 14Y) the widthwise lengths of which differ from each other. The amplifier 14X in the upper stage and the amplifier 14X in the lower stage are the same amplifiers 14. The amplifier 14Y in the upper stage and the amplifier 14Y in the lower stage are the same amplifiers 14. The order in which the amplifier 14X and the amplifier 14Y are arranged alongside one another differs between the upper side and the lower side of FIG. 2. In this instance, as can be understood by comparing the upper side and the lower side in FIG. 2, when the order in which the two of the amplifiers 14 whose widthwise lengths differ from each other are arranged alongside one another changes, the minimum required length of the bus bars 12 that are used also changes. In comparison with the alongside arrangement order in the upper side of FIG. 2, the alongside arrangement order in the lower side thereof is capable of achieving the connection between the amplifier 14X and the amplifier 14Y with shorter bus bars 12. In relation to this point, the alongside arrangement order in the lower side of FIG. 2 is more preferable than the alongside arrangement order in the upper side of FIG. 2.

Further, as the bus bars 12 become wider, the greater the rated current that they are capable of withstanding. Accordingly, concerning the bus bars 12, as the bus bars 12 that serve to connect the amplifiers 14 whose rated current is greater, it is desirable for wider ones of the bus bars 12 to be used. It is noted that, there is a tendency for the amplifiers 14 to be designed with a longer widthwise length as the rated current thereof becomes greater. Accordingly, there is a tendency for a need to occur in which the bus bars 12 are made wider as the bus bars 12 are connected to the amplifiers 14 whose widthwise length is longer. Further, in the case that the power source P, the bus bars 12, and the other bus bars 12 are electrically connected sequentially in this order, the width of the former bus bars 12 is preferably greater than or equal to the width of the latter bus bars 12.

In accordance with this feature, electric current is stably supplied to the latter bus bars 12.

In this manner, after having selected the amplifiers 14, it is necessary to further select the accessories (the bus bars 12) to be connected to the selected amplifiers (the selected amplifiers) 14. However, the types of the accessories to be connected to the selected amplifiers 14 differ depending on the order in which the selected amplifiers 14 are arranged alongside one another. Accordingly, in order to appropriately select the accessories to be connected to the plurality of the selected amplifiers 14, it is necessary to select the appropriate order in which the plurality of the selected amplifiers 14 are arranged alongside one another.

Based on the preliminary explanation provided above, the selection device 10 and the selection method according to the present embodiment will be described hereinafter. In the following description, the mutual connection of the plurality of the amplifiers 14 that are arranged alongside one another in the widthwise direction of the amplifiers 14 by one or more of the bus bars 12 may also be referred to as a "parallel connection".

Figure 3:
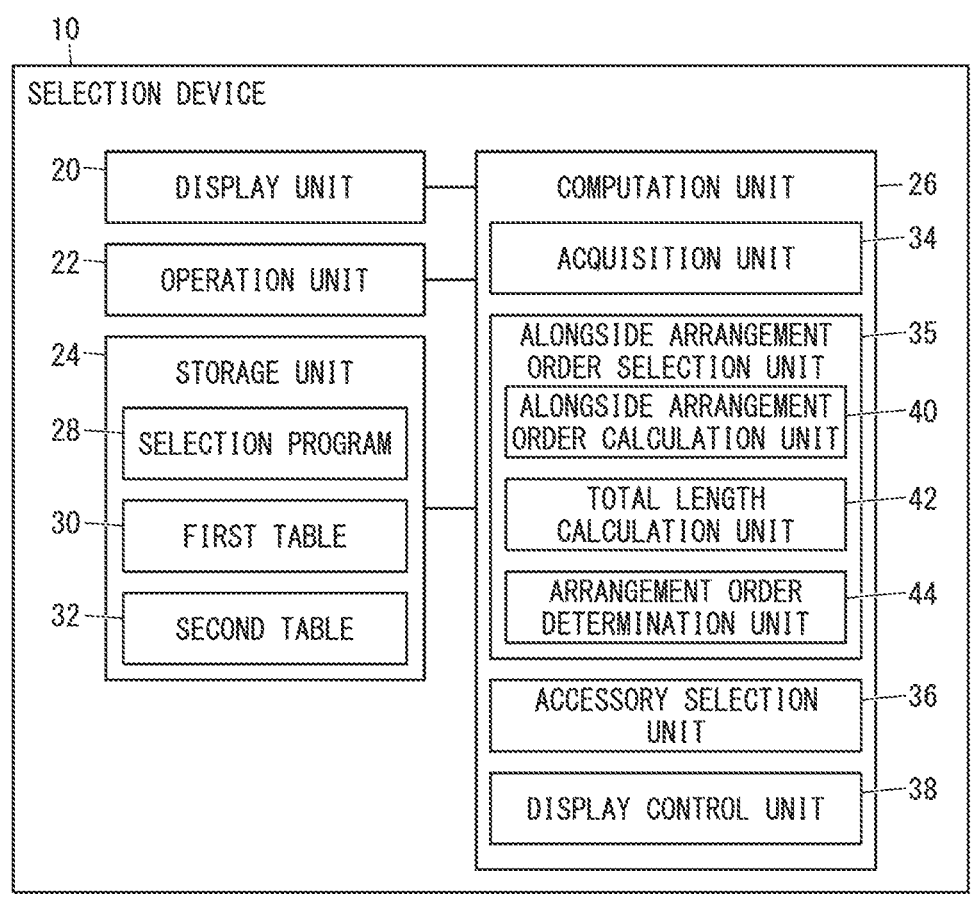
FIG. 3 is a schematic configuration diagram of a selection device according to an embodiment.

FIG. 3 is a schematic configuration diagram of the selection device 10 according to the embodiment.

The selection device 10 according to the present embodiment is an electronic device (a computer) provided in order to appropriately select an order in which the plurality of the amplifiers 14 are arranged alongside one another. As shown in FIG. 3, the selection device 10 is equipped with a display unit 20, an operation unit (input unit) 22, a storage unit 24, and a computation unit 26.

The display unit 20 enables the selection device 10 to display information. The display unit 20 is constituted, for example, by a display having a liquid crystal display screen 20a (refer to FIG. 6). However, the display screen 20a is not limited to being a liquid crystal screen. The display screen 20a, for example, may be an organic EL (OEL: Organic Electro-Luminescence) screen.

The operation unit 22 enables the operator to input information (instructions or commands) to the selection device 10. The operation unit 22 is constituted, for example, by a keyboard and a mouse. Moreover, it should be noted that the operation unit 22 is not limited to having a keyboard and a mouse. For example, the operation unit 22 may include a touch panel. The touch panel is installed, for example, on the display screen 20a.

The storage unit 24 enables the selection device 10 to store information. The storage unit 24 is constituted by a memory including, for example, a RAM (Random Access Memory), a ROM (Read Only Memory), and the like. The storage unit 24 stores a predetermined program in advance. The predetermined program includes, for example, a selection program 28 and the like. The selection program 28 is a program for causing the selection device 10 to execute a selection method for appropriately selecting an order in which the plurality of the amplifiers 14 are arranged alongside one another.

The storage unit 24 stores in association with each other the plurality of types of the amplifiers 14 and the plurality of types of the accessories that are capable of being connected to the amplifiers 14. For example, in the present embodiment, the storage unit 24 stores in advance information referred to as a first table 30 and information referred to as a second table 32.

FIG. 4 is an exemplary configuration of the first table 30 that is stored in the storage unit 24.

As shown in FIG. 4, the first table 30 is a table in which each of a plurality of types of the bus bars 12 is associated with a type of a connection source and a type of a connection destination. The lengths of the plurality of types of the bus bars 12 are different from each other in order to connect the plurality of the amplifiers 14 in parallel. The first table 30 associates, in relation to each of the plurality of the bus bars 12, the connection source, the connection destination, and the minimum required length in order to connect the connection source and the connection destination.

Referring to the first table 30 shown in FIG. 4, for example, the length of the bus bar 12A is 60 mm (millimeters). The connection source of the bus bar 12A is an amplifier 14 having a widthwise length of 60 mm. The connection destination of the bus bar 12A is not particularly limited. Further, for example, the length of the bus bar 12C is 150 mm. The connection source of the bus bar 12C is an amplifier 14 having a widthwise length of 150 mm. The connection destination of the bus bar 12C is an amplifier 14 other than the amplifier 14 having a widthwise length of 300 mm.

Further, according to the present embodiment, it is taken into consideration that the width of the bus bar 12 may differ in accordance with the types of the amplifiers 14 of the connection source and the connection destination. More specifically, the first table 30 further associates each of the plurality of types of the bus bars 12 with the width of the bus bars. In accordance with this feature, the connection source, the connection destination, and a minimum necessary width of the bus bars 12 are associated with each other. Such an association is performed in advance prior to the selection of the bus bars 12.

For example, the bus bar 12C and the bus bar 12F in FIG. 4 are both bus bars 12 having a length of 150 mm. However, the widths of the bus bar 12C and the bus bar 12F differ from each other. More specifically, the width of the bus bar 12C is 14 mm. In contrast thereto, the width of the bus bar 12F is 15 mm. Accordingly, the bus bar 12C is narrower (thinner) than the bus bar 12F. In the case that an amplifier 14 other than the amplifier 14 having a widthwise length of 300 mm serves as the connection destination, the bus bar 12C is a bus bar 12 having a minimum width that is capable of stably supplying the electrical power. On the other hand, in the case that the amplifier 14 having a widthwise length of 300 mm serves as the connection destination, the bus bar 12F is a bus bar 12 having a minimum width that is capable of stably supplying the electrical power.

FIG. 5 is an exemplary configuration of the second table 32 that is stored in the storage unit 24.

The second table 32 is a table that associates each of the types of the plurality of the amplifiers 14 with at least one of a widthwise length or a rated current of the amplifiers 14. In the second table 32 according to the present embodiment, as one example, each of the types of the plurality of the amplifiers 14 is associated with both a widthwise length and a rated current of the amplifier 14 (see FIG. 5). Referring to the second table 32 shown in FIG. 5, for example, the amplifier 14A is one in which the widthwise length thereof is 60 mm, and the rated current thereof is 20 A (amperes). Further, for example, the amplifier 14C is one in which the widthwise length thereof is 150 mm, and the rated current thereof is 80 A. Furthermore, in the plurality of the amplifiers 14 illustrated in FIG. 5, as the rated current thereof becomes greater, the widthwise length thereof becomes greater.

The computation unit 26 is constituted by a processor including, for example, a CPU (Central Processing Unit), a GPU (Graphics Processing Unit), and the like. The computation unit 26 is equipped with an acquisition unit 34, an alongside arrangement order selection unit 35, an accessory selection unit 36, and a display control unit 38 (refer to FIG. 3). The acquisition unit 34 acquires a plurality of the amplifiers (selected amplifiers) 14 which are selected in order to drive a plurality of the motors (designated motors) 16 that are designated in advance. The alongside arrangement order selection unit 35 selects a predetermined arrangement order of the plurality of the selected amplifiers 14 in the widthwise direction. The accessory selection unit 36 selects the accessories. The display control unit 38 causes the selection results to be displayed on the display unit 20. The acquisition unit 34, the alongside arrangement order selection unit 35, the accessory selection unit 36, and the display control unit 38 are realized by the computation unit 26 executing the selection program 28.

The acquisition unit 34 acquires a plurality of the selected amplifiers 14. The plurality of the selected amplifiers 14 are selected, for example, by a known type of amplifier selection device. The acquisition unit 34 is capable of acquiring the plurality of the selected amplifiers 14 from such an amplifier selection device. In this case, the term of "acquiring the selected amplifiers 14" includes acquiring information that is capable of identifying the types of the selected amplifiers 14 from information that is stored in the storage unit 24. More specifically, the acquisition unit 34 acquires, for example, the name (for example, the "amplifier 14A"), the widthwise length, the rated current, or the like, of the selected amplifier 14. In this instance, the acquisition unit 34 refers to the second table 32 as necessary. Consequently, the acquisition unit 34 identifies the types of the selected amplifiers 14 that have been acquired. Moreover, although a detailed description of this feature will be presented later, the selection device 10 may also select the selected amplifiers 14.

The types of the plurality of the selected amplifiers 14 that have been acquired are referred to by the alongside arrangement order selection unit 35. The alongside arrangement order selection unit 35 selects the predetermined arrangement order on the basis of the types of the plurality of the selected amplifiers 14. The predetermined arrangement order is an arrangement order in which the plurality of the selected amplifiers 14 are arranged alongside one another in the widthwise direction. In relation to this feature, the alongside arrangement order selection unit 35 includes an alongside arrangement order calculation unit 40, a total length calculation unit 42, and an arrangement order determination unit 44 (refer to FIG. 3). The alongside arrangement order calculation unit 40 calculates all of the possible orders in which the plurality of the selected amplifiers 14 are arranged alongside one another. Concerning all of the possible orders in which the plurality of the selected amplifiers 14 are arranged alongside one another, the total length calculation unit 42 selects (tentatively selects) the plurality of the bus bars 12 that are used. Concerning all of the possible orders in which the plurality of the selected amplifiers 14 are arranged alongside one another, the total length calculation unit 42 obtains the total length of the plurality of the bus bars 12 that have been tentatively selected. The arrangement order determination unit 44 determines, as the predetermined arrangement order, an alongside arrangement order that minimizes the total length of the bus bars, from among all of the possible arrangement orders in which the plurality of the selected amplifiers 14 are arranged alongside one another.

Concerning the selection of the predetermined arrangement order by the alongside arrangement order selection unit 35, a description will be presented of a specific example thereof. For example, a case is assumed in which the selected amplifiers 14 are the amplifier 14A, the amplifier 14C, and the amplifier 14E. In this case, the alongside arrangement order calculation unit 40 calculates all of the possible arrangement orders of the three types of the amplifiers 14. There are a total of six ways of arranging the three types of the amplifiers 14. Accordingly, in the present case, the alongside arrangement order calculation unit 40 calculates the six ways in which the amplifiers are arranged alongside one another. Further, the total length calculation unit 42 tentatively selects the bus bars 12 that are used in relation to all of the six ways in which the amplifiers are arranged alongside one another. The provisional selection is carried out on the basis of the types of the plurality of the selected amplifiers 14, and the types of the connection sources and the connection destinations that are stored in the storage unit 24.

The tentative selection made by the total length calculation unit 42 will be described while taking as an example the order in which the amplifier 14A, the amplifier 14C, and the amplifier 14E are arranged alongside one another sequentially in this order along the +W direction. According to FIG. 5, the widthwise length of the amplifier 14A is 60 mm. The widthwise length of the amplifier 14C is 150 mm. The widthwise length of the amplifier 14E is 260 mm. The connection source of the bus bar 12A is the amplifier 14A. The connection destination of the bus bar 12A is the amplifier 14C. In this case, by referring to the first table 30 in the storage unit 24, the total length calculation unit 42 provisionally selects the bus bar 12A (number of bars for use: 2). Further, the connection source of the bus bar 12C is the amplifier 14C. The connection destination of the bus bar 12C is the amplifier 14E. In this case, by referring to the first table 30 in the storage unit 24, the total length calculation unit 42 provisionally selects the bus bar 12C (number of bars for use: 2). The total length calculation unit 42 carries out the provisional selection concerning the other five orders in which the amplifiers are arranged alongside one another, in the same manner.

Next, a description will be presented concerning the calculation of the total length of the bus bars 12 by the total length calculation unit 42. In the present description, similar to what was described previously, a case will be presented as an example in which the amplifier 14A, the amplifier 14C, and the amplifier 14E are arranged alongside one another sequentially in this order in the +W direction. The bus bars 12 that have been tentatively selected by the total length calculation unit 42, as described above, are the bus bar 12A (length: 60 mm) and the bus bar 12C (length: 150 mm). The required number for each of the bus bars 12A and 12C is two. In this case, the total length calculation unit 42, for example, calculates 420 mm (=60 mm+60 mm+150 mm+150 mm) as being the total length of the bus bars in the case where the amplifiers are arranged alongside one another in the exemplified order. The total length calculation unit 42, in the same manner, calculates the total length of the bus bars 12 for the other five orders in which the amplifiers are arranged alongside one another.

The arrangement order determination unit 44 refers to the calculation results of the total length calculation unit 42. Consequently, from among the six possible alongside arrangement orders calculated by the alongside arrangement order calculation unit 40, the arrangement order determination unit 44 specifies the alongside arrangement order that minimizes the total length of the bus bars 12 that are used. The alongside arrangement order specified in the above manner becomes the selection result (the predetermined arrangement order) of the alongside arrangement order selection unit 35.

The accessory selection unit 36 selects the types and the numbers of the accessories that are connected to the plurality of the selected amplifiers 14 that are arranged alongside one another in the predetermined arrangement order. The accessory selection unit 36 according to the present embodiment selects at least the types and the numbers of the bus bars 12 that are used in order to connect the plurality of the selected amplifiers 14 in parallel. This selection is carried out on the basis of the predetermined arrangement order that has been determined, and the types of the connection sources and the connection destinations that are stored in the storage unit 24. In this case, the accessory selection unit 36 refers to the result of the tentative selection carried out by the total length calculation unit 42.

Figure 6:
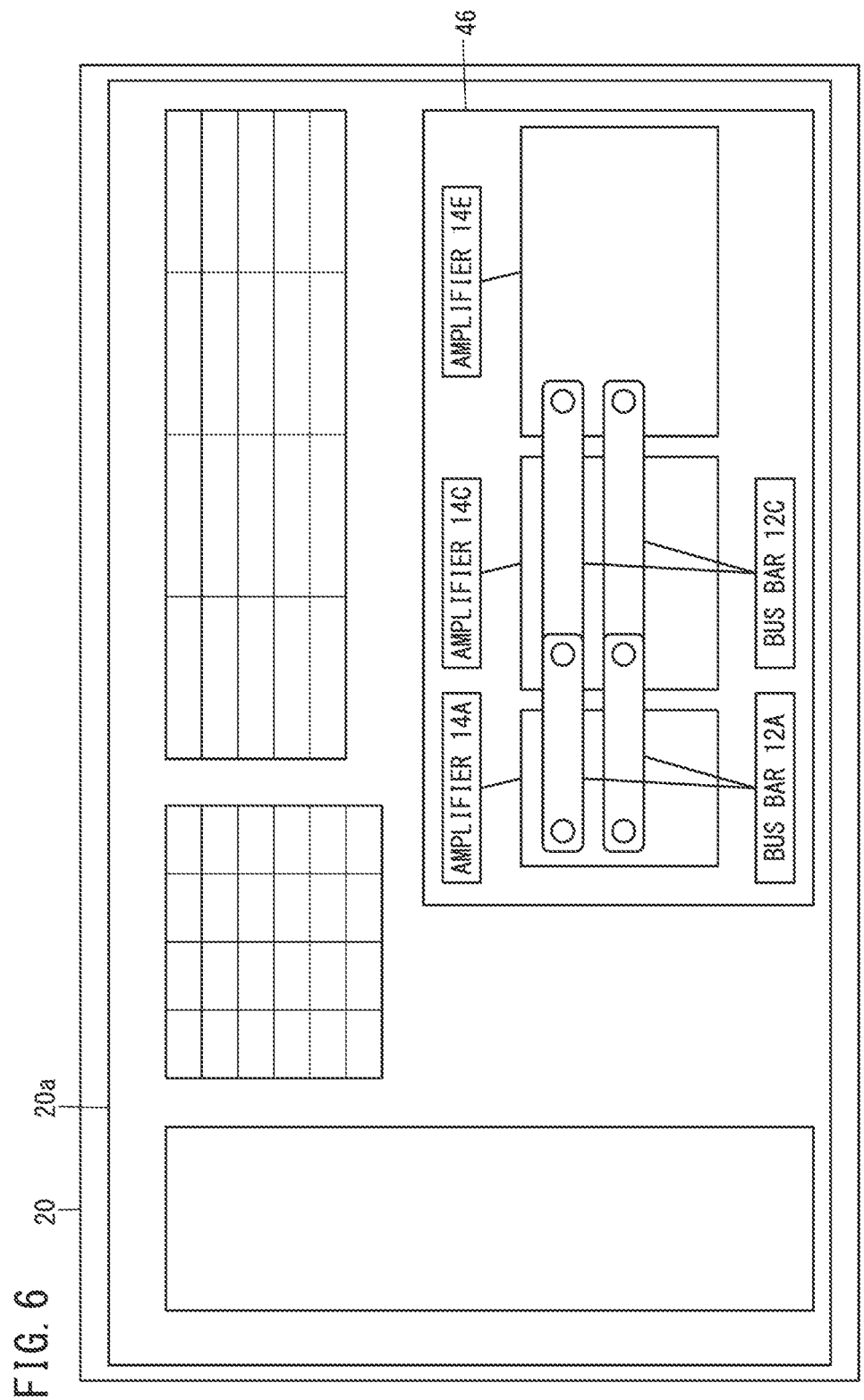
FIG. 6 is a schematic diagram illustrating a selection result displayed on a display unit by a display control unit.

FIG. 6 is a schematic diagram illustrating the selection results that are displayed on the display unit 20 by the display control unit 38.

The display control unit 38 causes the display screen 20a of the display unit 20 to display the predetermined arrangement order selected by the alongside arrangement order selection unit 35, and the types and the numbers of the bus bars 12 that have been selected by the accessory selection unit 36. As shown in FIG. 6, the display control unit 38 causes the selected types of the bus bars 12 to be displayed on a wiring diagram 46. The wiring diagram 46 shows a wiring configuration for a case in which the plurality of the selected amplifiers 14 are connected in parallel by the selected bus bars 12. Such a case is preferable in order for the operator to easily grasp the wiring configuration. However, the present invention is not limited to this feature, and for example, the display control unit 38 may display a list that shows the selection results. Moreover, it should be noted that the user interface on the display screen 20a of FIG. 6 is merely illustrated as an example. Accordingly, in the present embodiment, the user interface on the display screen 20a is not particularly limited.

Further, although not shown in FIG. 6, it is more preferable for the display control unit 38 to also display, in the wiring diagram 46, the designated motors 16 connected to the selected amplifiers 14, and the power source P. In accordance with this feature, the manner in which the amplifiers 14 and the motors 16 should be wired and connected is visually displayed to the operator in an easily understandable manner. Moreover, the designated motors 16 are acquired by the acquisition unit 34 in the same manner as the selected amplifiers 14.

More preferably, the display control unit 38 also causes there to be displayed on the display unit 20 detailed specifications (for example, a rated current) of the plurality of the selected amplifiers 14. More preferably, the display control unit 38 also causes there to be displayed on the display unit 20 detailed specifications (for example, a rated current and a rated torque) of the designated motors 16. Among the selected amplifiers 14 and the designated motors 16 that are displayed on the display unit 20, the detailed specifications may be displayed concerning only the amplifiers and motors that have been specified by the operator via the operation unit 22. In accordance with this feature, it becomes easy for the operator to confirm the detailed specifications of each of the selected amplifiers 14 and the designated motors 16.

According to the above-described selection device 10, the order (the predetermined arrangement order) in which the plurality of the selected amplifiers 14 are arranged alongside one another in the widthwise direction is automatically and appropriately selected by the alongside arrangement order selection unit 35 provided in the selection device 10. Further, the selection device 10 according to the present embodiment further includes the accessory selection unit 36. Accordingly, the bus bars 12 in order to connect the plurality of the selected amplifiers 14 that are arranged alongside one another in the predetermined arrangement order are appropriately selected.

The selection device 10 according to the present embodiment determines, as the predetermined arrangement order, an alongside arrangement order that minimizes the total length of the bus bars 12 that are used, from among all of the possible arrangement orders in which the plurality of the selected amplifiers 14 are arranged alongside one another. In accordance with this feature, the selection device 10 can prompt the operator to efficiently make use of resources (i.e., to reduce the occasions in which large scale bus bars 12 are used, and to promote the use of small scale bus bars 12).

The above is an exemplary configuration of the selection device 10 according to the present embodiment. Next, a description will be presented concerning the selection method which is executed by the above-described selection device 10.

Figure 7:
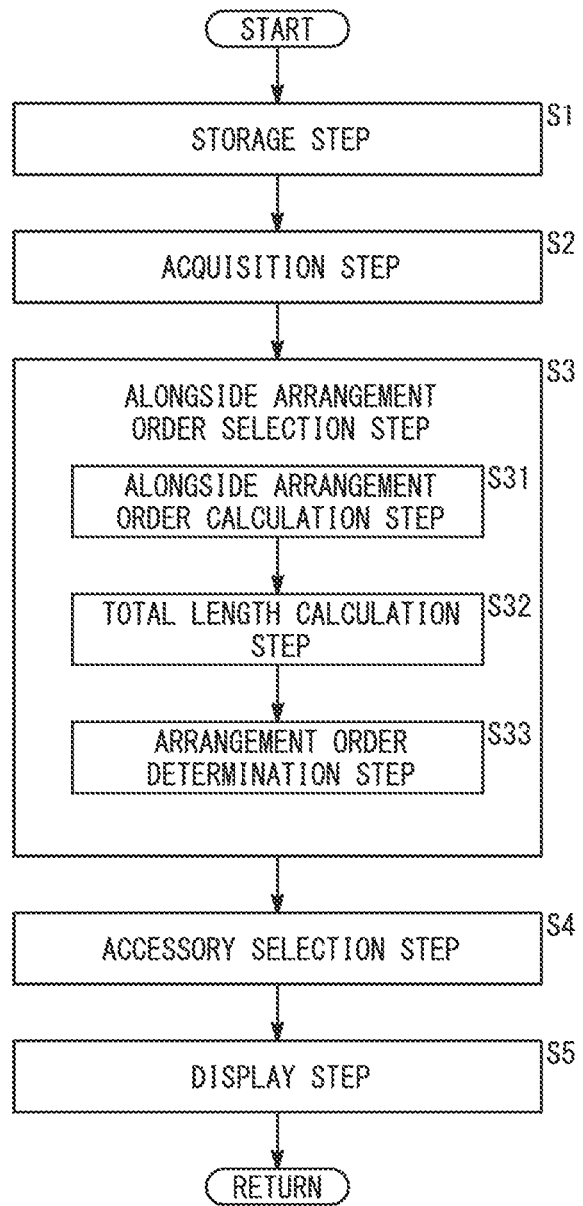
FIG. 7 is a flowchart illustrating a process flow of a selection method according to an embodiment.

FIG. 7 is a flowchart illustrating a process flow of the selection method according to the embodiment.

The selection method shown in FIG. 7 is a method for appropriately selecting the order in which the plurality of the amplifiers 14 are arranged alongside one another. The selection method shown in FIG. 7 includes a storage step S1, an acquisition step S2, an alongside arrangement order selection step S3, an accessory selection step S4, and a display step S5.

In the storage step S1, the storage unit 24 stores the plurality of types of the amplifiers 14. In this instance, for each of the plurality of types of the bus bars 12, the storage unit 24 stores the type of the connection source (the amplifier 14) of the bus bar 12, and the type of the connection destination (the amplifier 14) of the bus bar 12. The plurality of types of the bus bars 12 differ from each other at least in terms of the length thereof. Moreover, it should be noted that the storage step S1 may be completed up until the selection device 10 is shipped from the factory. In this case, the operator need not be required to perform the storage step S1 anew.

In the acquisition step S2, the acquisition unit 34 acquires the plurality of the selected amplifiers 14. Each of the plurality of the selected amplifiers 14 is an amplifier 14 that is selected in order to drive the motors 16 that are designated beforehand.

In the alongside arrangement order selection step S3, the alongside arrangement order selection unit 35 selects a predetermined arrangement order in which the selected amplifiers are arranged alongside one another. The alongside arrangement order selection step S3 shown in FIG. 7 includes an alongside arrangement order calculation step S31, a total length calculation step S32, and an arrangement order determination step S33.

In the alongside arrangement order calculation step S31, the alongside arrangement order calculation unit 40 calculates all of the possible orders in which the plurality of the selected amplifiers 14 are arranged alongside one another.

Concerning all of the possible orders in which the plurality of the selected amplifiers 14 are arranged alongside one another, in the total length calculation step S32, the total length calculation unit 42 determines the total length of the plurality of the bus bars 12 that are used. In this instance, the total length calculation unit 42 tentatively selects the types of the bus bars 12, and the number of the bus bars 12 that are used for each of the possible orders in which the plurality of the selected amplifiers 14 are arranged alongside one another.

In the arrangement order determination step S33, the arrangement order determination unit 44 determines, as the predetermined arrangement order, an alongside arrangement order of the plurality of the selected amplifiers 14 that minimizes the total length of the bus bars. In this instance, the arrangement order determination unit 44 appropriately refers to the total length calculated for each of the alongside arrangement orders in which the plurality of the selected amplifiers 14 are arranged alongside one another.

In the accessory selection step S4, the accessory selection unit 36 selects the types and the numbers of the accessories that are connected to the plurality of the selected amplifiers 14. Moreover, it is noted that the types of the bus bars 12 that are used in the case that the plurality of the selected amplifiers 14 are arranged alongside one another in the predetermined alongside arrangement order, and the number of bus bars for use have already been specified in the total length calculation step S32. Accordingly, the accessory selection unit 36 may appropriately refer to the results of the tentative selection that has been carried out in relation to the predetermined arrangement order.

In the display step S5, the display control unit 38 causes the predetermined arrangement order to be displayed on the display unit 20. In the present example, the accessory selection step S4 is executed prior to the display step S5. Accordingly, the display control unit 38 is capable of further displaying on the display unit 20 the types of the accessories selected by the accessory selection unit 36, and the number of such accessories for use.

The above is an exemplary configuration of the selection method according to the present embodiment. As described above, according to the present embodiment, the selection device 10 and the selection method are provided for appropriately selecting the order in which the plurality of the amplifiers 14 are arranged alongside one another.

Exemplary Modifications

The embodiment has been described above as one example of the present invention. Various modifications or improvements are capable of being added to the above-described embodiment. Further, it is clear from the scope of the claims that other modes to which such modifications or improvements have been added can be included within the technical scope of the present invention.

Hereinafter, a description will be presented of some specific examples concerning the exemplary modifications according to the present embodiment. However, in the following description, descriptions that overlap or are duplicative with those of the embodiment will be omitted insofar as possible. Further, unless otherwise specified, the reference numerals appended to the elements described in the embodiment are used from the embodiment.

Exemplary Modification 1

The operator may change the predetermined arrangement order that has been selected. More specifically, the selection device 10 causes the selection results to be displayed on the display unit 20. Thereafter, the selection device 10 may accept an operation from the operator in order to change the predetermined arrangement order.

The accessory selection unit 36 reselects the types and the number of the bus bars 12 based on the predetermined arrangement order after having been changed. Further, the display control unit 38 causes there to be displayed on the display unit 20 the predetermined arrangement order that has been changed, the types of the bus bars 12 that have been reselected, and the number of such bus bars 12. According to the present exemplary modification, convenience for the operator can be achieved.

Exemplary Modification 2

In the above embodiment, a criterion for determining the predetermined arrangement order is that the total length of the bus bars 12 becomes minimized. However, the criterion for determining the predetermined arrangement order is not limited to this feature. For example, the selection device 10 may determine, as the predetermined arrangement order, an order in which the plurality of the selected amplifiers 14 are arranged alongside one another in order of a rated current magnitude of the plurality of the amplifiers 14. Hereinafter, an exemplary modification of the selection device 10 based on the aforementioned description will be described.

Moreover, in the following description, the alongside arrangement order selection unit 35 may also be referred to as an "alongside arrangement order selection unit 35A" in order to distinguish it from the embodiment. Further, for the same reason, the accessory selection unit 36 may also be referred to as an "accessory selection unit 36A".

Figure 8:
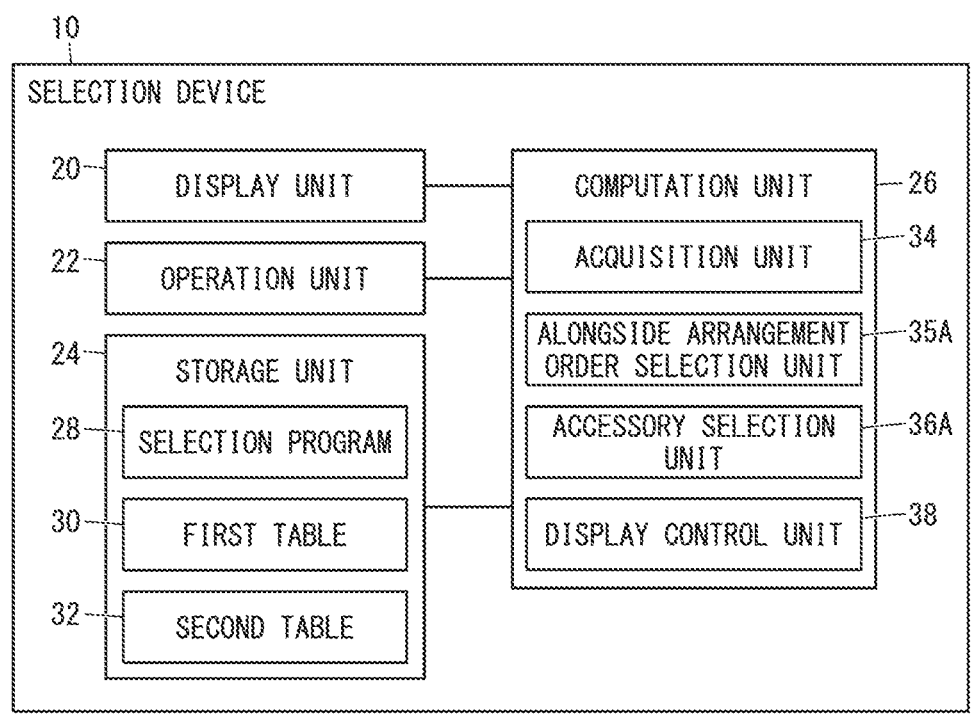
FIG. 8 is a schematic configuration diagram of a selection device according to an Exemplary Modification 2.

FIG. 8 is a schematic configuration diagram of the selection device 10 according to the Exemplary Modification 2.

The alongside arrangement order selection unit 35A selects, as the predetermined arrangement order, an order in which the plurality of the selected amplifiers 14 are arranged alongside one another in order of the rated current magnitude. The rated current of each of the plurality of the amplifiers 14 is stored in the storage unit 24. Accordingly, the alongside arrangement order selection unit 35A selects the predetermined arrangement order by appropriately referring to the storage unit 24. For example, the plurality of the selected amplifiers 14 includes the amplifier 14A, the amplifier 14C, and the amplifier 14E. The rated currents of the plurality of the amplifiers 14 are stored in the storage unit 24 (refer to FIG. 5). The rated current of the amplifier 14A is 20 A. The rated current of the amplifier 14C is 80 A. The rated current of the amplifier 14E is 150 A. In this case, the alongside arrangement order selection unit 35A determines, as the predetermined arrangement order, an alongside arrangement order in which the amplifier 14E, the amplifier 14C, and the amplifier 14A are sequentially arranged alongside one another along the +W direction.

The predetermined arrangement order selected by the alongside arrangement order selection unit 35A is referred to by the accessory selection unit 36A. Based on the predetermined arrangement order, the accessory selection unit 36A selects the types of the accessories that are connected to the plurality of the selected amplifiers 14, and the number of the accessories for use. For example, based on the predetermined arrangement order, the type of the connection source, and the type of the connection destination, the accessory selection unit 36A selects the types of the bus bars 12 and the number of the bus bars 12 to be used.

According to the present exemplary modification, the operator can easily obtain the predetermined arrangement order of the plurality of the selected amplifiers 14, the types of the bus bars 12 that are used, and the number of the bus bars 12 for use. Moreover, it is noted that the amplifiers 14 have a tendency in which the widthwise length thereof becomes larger as the rated current becomes greater (refer to the embodiment). Accordingly, the arrangement order determination unit 44 may determine, as the predetermined arrangement order, an alongside arrangement order in which the plurality of the selected amplifiers 14 are arranged alongside one another in order of the widthwise length thereof.

Figure 9A:
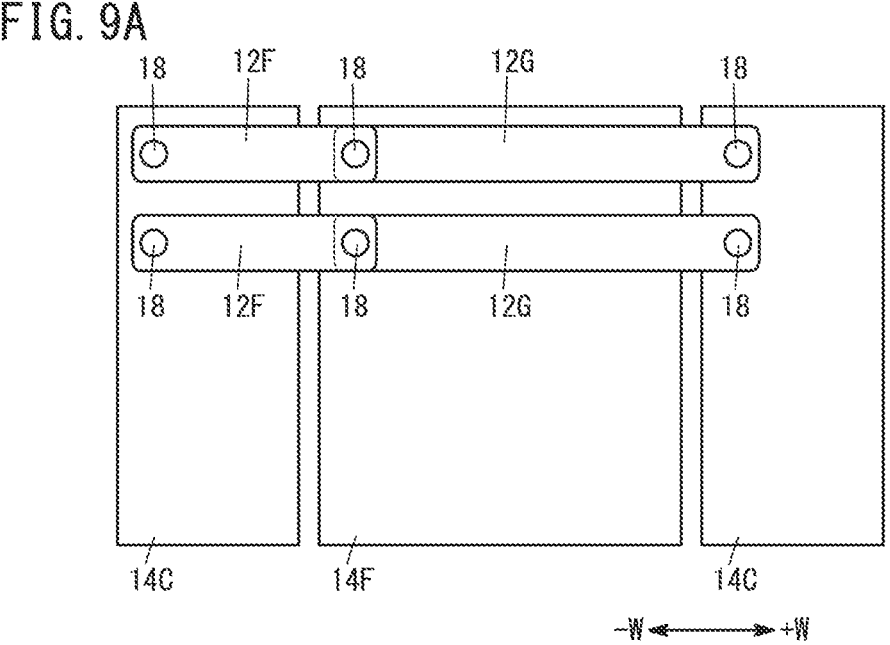
FIG. 9A is a schematic diagram illustrating a plurality of amplifiers arranged without regard to an order of a rated current magnitude, and bus bars connecting the plurality of amplifiers.

FIG. 9A is a schematic diagram illustrating the plurality of the amplifiers 14, which are arranged without regard to the order of the rated current magnitude, and the bus bars 12 that connect the plurality of the amplifiers 14.

The selection device 10 according to the present exemplary modification enables narrow bus bars 12 (small scale bus bars 12) to be easily selected. Concerning this feature, hereinafter, a description thereof will be presented with reference to FIGS. 9A and 9B.

In FIG. 9A, one of the amplifiers 14F, and two of the amplifiers 14C are illustrated. The rated current of the amplifier 14F is 200 A. The widthwise length of the amplifier 14F is 300 mm. The rated current of the amplifier 14C is 80 A. The widthwise length of the amplifier 14C is 150 mm. The amplifier 14C, the amplifier 14F, and the amplifier 14C are arranged alongside one another sequentially in this order along the +W direction (refer to FIG. 9A). The plurality of the bus bars 12, which are selected on the basis of this alongside arrangement order, include a bus bar 12F and a bus bar 12G (refer to FIG. 9A). The bus bar 12F is a bus bar 12 for connecting the amplifier 14C that is arranged on the −W direction side, and the amplifier 14F that is arranged in the center. The bus bar 12G is a bus bar 12 for connecting the amplifier 14F that is arranged in the center, and the amplifier 14C that is arranged on the +W direction side. Both the bus bar 12F and the bus bar 12G have a width (15 mm) that is suitable for being connected to the amplifier 14 having a widthwise length of 300 mm.

Figure 9B:
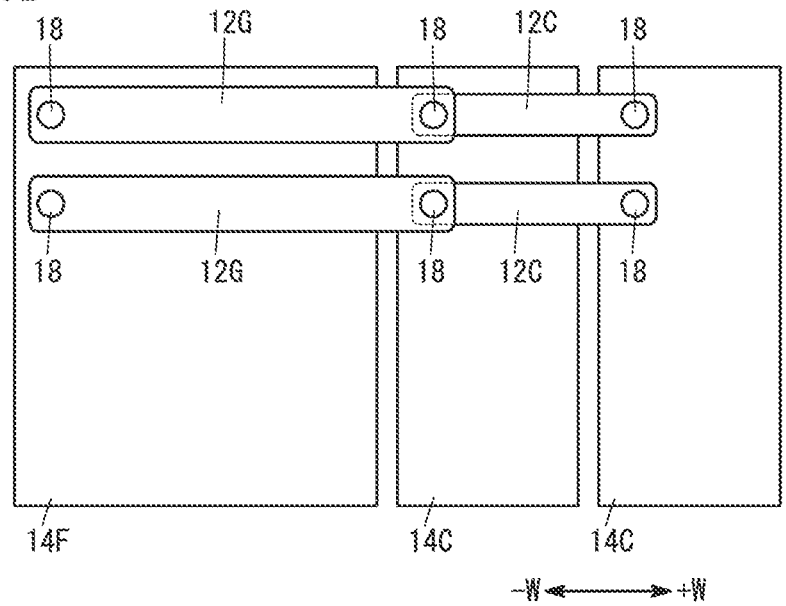
FIG. 9B is a schematic diagram illustrating the plurality of amplifiers shown in FIG. 9A which are arranged in order of a rated current magnitude, and bus bars connecting the plurality of amplifiers.

FIG. 9B is a schematic diagram illustrating the plurality of the amplifiers 14 shown in FIG. 9A, which are arranged in order of the rated current magnitude, and the bus bars 12 that connect the plurality of the amplifiers 14.

Next, based on the example shown in FIG. 9A, a case will be described in which one of the amplifiers 14F and two of the amplifiers 14C are arranged alongside one another in order of the rated current magnitude. In this case, the amplifier 14F, the amplifier 14C, and the amplifier 14C are arranged alongside one another sequentially in this order along the +W direction (refer to FIG. 9B). In this case, based on the first table 30, the accessory selection unit 36A selects the bus bar 12G and the bus bar 12C. In other words, differing from the previously described example shown in FIG. 9A, in the example shown in FIG. 9B, the bus bars 12F and 12G are not selected. The bus bar 12C is narrower than the bus bar 12G. In this manner, if the predetermined arrangement order is an order of the rated current magnitude, then the required number of the wide bus bars 12 can be easily reduced. The bus bar 12G connects the amplifier 14F that is arranged on the −W direction side, and the amplifier 14C that is arranged in the center. The bus bar 12C serves to connect the amplifier 14C that is arranged in the center, and the amplifier 14C that is arranged on the +W direction side.

Moreover, it should be noted that the plurality of the selected amplifiers 14 include a converter and an inverter. In general, the rated current (capacity) of the converter should be greater than or equal to the rated current of the inverter. In the case that a plurality of the inverters are connected to the converter, the rated current of the converter must be greater than or equal to the total value of the rated currents of the plurality of the inverters. Accordingly, in the case of the present exemplary modification, the converter and the inverter are sequentially arranged in this order along the +W direction.

Exemplary Modification 3

The selection device 10 may select the plurality of the designated motors 16, and the plurality of the selected amplifiers 14. Hereinafter, the selection device 10, which is capable of selecting the plurality of the designated motors 16 and the plurality of the selected amplifiers 14, will be described.

Moreover, in the following description, the storage unit 24 is referred to as a "storage unit 24C".

Figure 10:
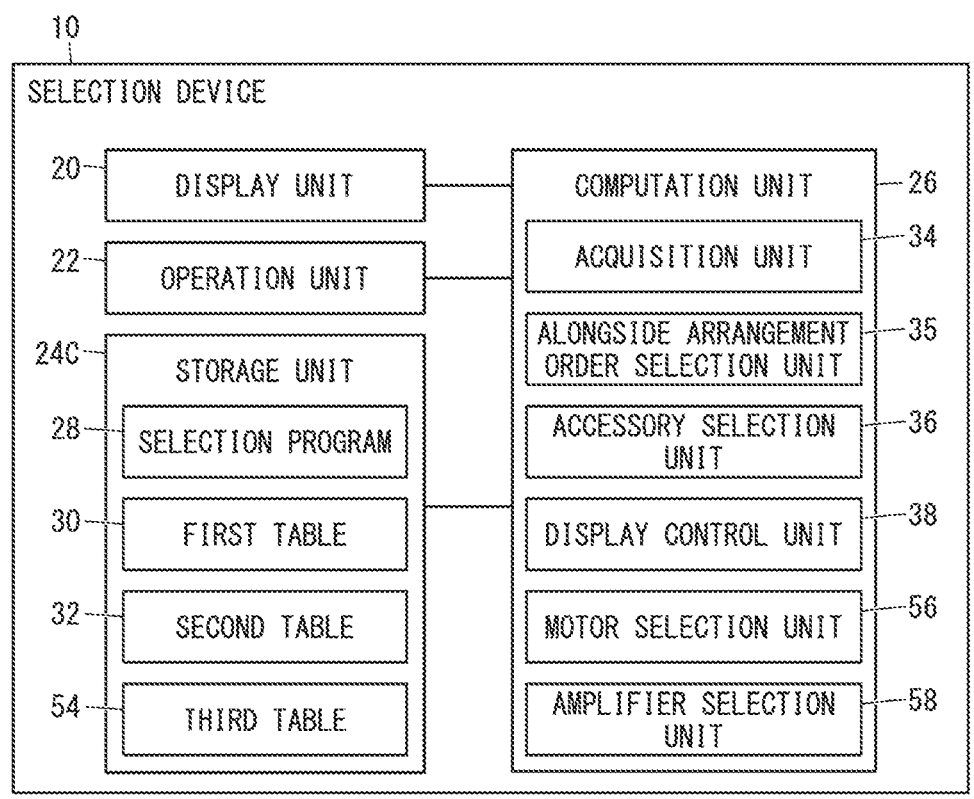
FIG. 10 is a schematic configuration diagram of a selection device according to an Exemplary Modification 3.

FIG. 10 is a schematic configuration diagram of the selection device 10 according to the Exemplary Modification 3.

A third table 54 (refer to FIG. 10) is further stored in the storage unit 24C. The third table 54 is a table in which, concerning each of the plurality of the motors 16, the performance of the motors 16, and the types of the amplifiers 14 that are capable of driving the motors 16 are associated with each other. The selection device 10 according to the present exemplary modification is further equipped with a motor selection unit 56, and an amplifier selection unit 58. The motor selection unit 56 selects the plurality of the designated motors 16. The amplifier selection unit 58 selects the selected amplifiers 14 for driving the plurality of the designated motors 16. The plurality of the designated motors 16 are driven by the plurality of the selected amplifiers 14.

FIG. 11 is a diagram showing an exemplary configuration of the third table 54.

The performance of the motors 16 for example, is the rated current of the motors 16. The rated currents of the plurality of the motors 16A to 16F are stored in the third table 54. For example, the rated current of the motor 16A is 20 A (refer to FIG. 11). However, the performance of the motors 16 is not limited to being the rated current. The performance of the motors 16 may be, for example, a rated torque of the motors 16, a maximum torque of the motors 16, or a maximum rotational speed of the motors 16.

The amplifiers 14 that are capable of driving the motors 16 are specified on the basis of the second table 32. For example, the rated current of the amplifier 14A is 20 A (refer to FIG. 5). Accordingly, the motor 16A which has a rated current of 20 A is capable of being driven by the amplifier 14A.

The operator designates the performance of the motors 16, and the required number of the motors 16 via the operation unit 22. The motor selection unit 56 selects the type of the designated motors 16 based on the designated performance of the motors 16. For example, the operator has specified a "rated current: 20 A" as the performance of the motors 16. In this case, the motor selection unit 56 selects the motor 16A on the basis of the third table 54. In this case, the motor 16A selected by the motor selection unit 56 serves as the designated motor 16. In addition, the operator has further specified the required number of the motors 16 as being "2". In this case, the motor selection unit 56 selects two of the motors 16A.

The amplifier selection unit 58 selects the amplifiers 14 on the basis of the rated current of the designated motors 16. The amplifier selection unit 58 selects the selected amplifiers 14 for each of the plurality of the designated motors 16. In this instance, the amplifier selection unit 58 appropriately refers to the second table 32. Consequently, the amplifiers 14 corresponding respectively to the plurality of the designated motors 16 are selected. For example, the motor selection unit 56 has selected the motor 16A. In this case, the amplifier selection unit 58 selects the amplifier 14A. The amplifiers 14 selected by the amplifier selection unit 58 serve as the selected amplifiers 14. The type of the selected amplifiers 14 is acquired by the acquisition unit 34.

According to the present exemplary modification, the selection device 10 for carrying out the selection of the plurality of the designated motors 16, and the selection of the plurality of the selected amplifiers 14 is provided. The selection device 10 selects the bus bars 12 on the basis of the selection results of the selection of the plurality of the designated motors 16 and the selection of the plurality of the selected amplifiers 14.

Exemplary Modification 4

In the wiring connection between the motors 16 and the amplifiers 14, the selection device 10 may be configured in a manner so as to be capable of selecting required accessories other than the bus bars 12. Hereinafter, such a selection device 10 which is capable of selecting accessories other than the bus bars 12 will be described.

Some examples of the accessories other than the bus bars 12 will be illustrated next. More specifically, for example, a breaker, a magnetic contactor, a fuse, a noise filter, a motor cable, an amplifier cable, a power transformer, and a lightning surge protector may serve as the accessories. These accessories, together with the motors 16, the amplifiers 14, and the bus bars 12, are included in the wiring configuration. The accessories are used differently depending on the types of the motors 16 or the types of the amplifiers 14. For example, the motor cables are cables that are connected to the motors 16. The motor cables can be used without regard to the amplifiers 14. In contrast thereto, the amplifier cables are cables that are connected to the amplifiers 14. The amplifier cables can be used without regard to the motors 16. However, the accessories for the same items may have a plurality of types. For example, in the amplifier cables, there is a type that is used with the amplifiers 14 having a rated current of 20 A, and a type that is used with the amplifiers 14 having a rated current of 40 A. Concerning the other accessories as well, there may be cases in which the corresponding amplifiers 14, or alternatively, the corresponding motors 16 are determined in advance.

A corresponding relationship between the accessories, the types of the motors 16, and the types of the amplifiers 14 is stored in the storage unit 24. In that case, by appropriately referring to the storage unit 24, the accessory selection unit 36 selects the accessories corresponding to each of the plurality of the designated motors 16. Further, by appropriately referring to the storage unit 24, the accessory selection unit 36 selects the accessories corresponding to each of the plurality of the selected amplifiers 14. The selected accessories are included in the selection results displayed on the display unit 20. In accordance with this feature, further convenience for the operator can be achieved.

FIG. 12A is a diagram showing an exemplary configuration of the third table 54 according to the Exemplary Modification 4. FIG. 12B is a diagram showing an exemplary configuration of a fourth table 62 according to the Exemplary Modification 4.

Hereinafter, a specific example of the present exemplary modification will be described with reference to FIGS. 12A and 12B. The third table 54 according to the present exemplary modification is shown in FIG. 12A. The third table 54 further associates the plurality of the motors 16 with respective cable diameters (AWG standard) of motor cables that are capable of being used in the motors 16. Further, the fourth table 62 according to the present exemplary modification is shown in FIG. 12B. The fourth table 62 associates the plurality of the motor cables with the respective cable diameters (AWG standard) thereof.

In this instance, a case in which the plurality of the designated motors 16 include the motor 16A will be presented as an example. A motor cable that is capable of being used with the motor 16A is a motor cable having a cable diameter of AWG 14 (refer to FIG. 12A). A motor cable having a cable diameter of AWG 14 is the motor cable A (refer to FIG. 12B). In this case, the accessory selection unit 36 selects the motor cable A. Further, the display control unit 38 causes the motor cable A to be displayed on the display unit 20. Consequently, the operator is made aware that the motor cable A is capable of being used.

Exemplary Modification 5

The present exemplary modification is described in relation to the Exemplary Modification 4. The price of each of the accessories may be stored in the storage unit 24. For example, the plurality of types of the motor cables may include types in which the cable diameters are the same as each other but for which the prices thereof differ from each other. In this case, the accessory selection unit 36 refers to the price of each of the motor cables. Consequently, the accessory selection unit 36 is capable of selecting the motor cables having a lower price. As a result, the selection device 10 contributes to a reduction in the costs for the operator to procure the accessories.

Exemplary Modification 6

Figure 13:
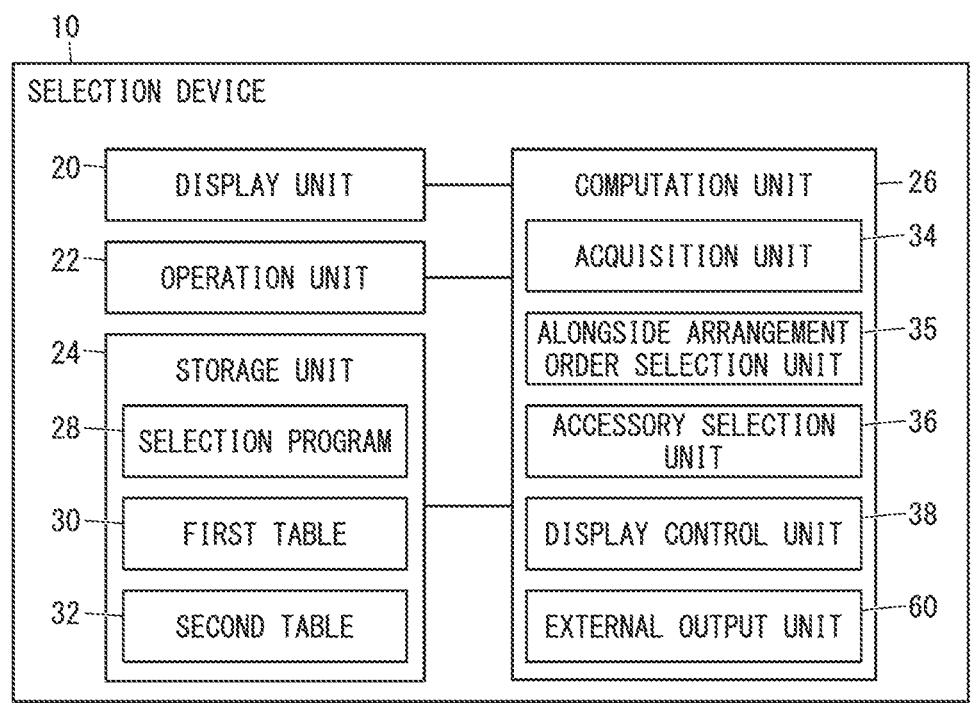
FIG. 13 is a schematic configuration diagram of a selection device according to an Exemplary Modification 6.

FIG. 13 is a schematic configuration diagram of the selection device 10 according to an Exemplary Modification 6.

The selection device 10 may further include an external output unit 60 (refer to FIG. 13). The external output unit 60 generates electronic data of an order form that is addressed to a maker (manufacturer). One or more items (components) that are specified by the operator from among the selected amplifiers 14, the designated motors 16, and the selected accessories are described on the order form. The operator designates the items described on the order form, via the operation unit 22. Further, the external output unit 60 externally outputs the order form. Consequently, for example, in the case that the required accessories are insufficient, the operator can easily carry out placement of an order to the maker for the insufficient components. The external output unit 60, for example, issues a command to a printing machine to cause the printing machine to print out the order form. Consequently, the operator can easily obtain the order form in the form of a paper medium. Moreover, for example, electronic data of the order form may be attached to an email message that is addressed to the maker.

Exemplary Modification 7

The exemplary modifications described above may be appropriately combined within a range in which no inconsistencies occur.

Inventions that can be Obtained from the Embodiment

The inventions that can be grasped from the above-described embodiment and the modifications thereof will be described below.

First Invention

The selection device (10) selects the predetermined arrangement order of the plurality of the amplifiers (14). The selection device is equipped with the storage unit (24), the acquisition unit (34), the alongside arrangement order selection unit (35), and the display control unit (38). The storage unit (24) stores in advance the plurality of types of the amplifiers. The acquisition unit (34) acquires the plurality of the selected amplifiers which are selected in order to drive the plurality of the designated motors (16) that have been designated in advance. The alongside arrangement order selection unit (35) selects the predetermined arrangement order in which the plurality of the selected amplifiers are arranged adjacent to each other in the widthwise direction, based on the types of the plurality of the selected amplifiers. The display control unit (38) causes the predetermined arrangement order to be displayed on the display unit (20).

In accordance with such features, the selection device is provided that appropriately selects the order in which the plurality of the amplifiers are arranged alongside one another.

The storage unit may store, in association with each other, the plurality of types of the amplifiers, and the widthwise length or the rated current of the amplifiers. The alongside arrangement order selection unit may determine the alongside arrangement order, as the predetermined arrangement order, on the basis of the widthwise length or the rated current of the amplifiers that is stored in the storage unit. The above alongside arrangement order is an arrangement order in which the plurality of the selected amplifiers are arranged in order of the widthwise length or the rated current magnitude of the amplifiers. In accordance with such features, it is easier to reduce the required number of the wide bus bars (12).

The first invention may further be equipped with the accessory selection unit (36) that selects the type and the number of accessories connected to the plurality of the selected amplifiers. The storage unit may further store, in association with each other, the plurality of types of the amplifiers and the plurality of types of the accessories that are capable of being connected to the amplifiers. The accessory selection unit may select the type and the number of the accessories that are connected to the plurality of the selected amplifiers, based on the predetermined arrangement order and the types of the plurality of the selected amplifiers. In accordance with such features, not only the predetermined arrangement order of the selected amplifiers, but also the accessories are selected.

One item concerning the accessories may be the bus bars (12) that connect the plurality of the amplifiers. The storage unit may store, in association with each other, the plurality of types of the bus bars which are at least different in width from each other, and the types of the amplifiers of the connection sources and the connection destinations. The accessory selection unit may select the type and the number of the bus bars in a manner so that the width of the bus bars is as small as possible, based on the types of the amplifiers of the connection sources and the connection destinations. In accordance with such features, it can be easier to reduce the required number of the wide bus bars.

The first invention may further be equipped with the accessory selection unit (36) that selects the type and the number of the accessories that are connected to the plurality of the selected amplifiers that are arranged in the predetermined arrangement order. The storage unit may further store, in association with each other, the plurality of types of the amplifiers and the plurality of types of the accessories that are capable of being connected to the amplifiers. The accessory selection unit may select the type and the number of the accessories that are connected to the plurality of the selected amplifiers, based on the types of the plurality of the selected amplifiers. In accordance with such features, not only the predetermined arrangement order of the selected amplifiers, but also the accessories are selected.

One item concerning the accessories may be the bus bars (12) that connect the plurality of the amplifiers. The storage unit may store, in association with each other, the plurality of types of the bus bars which are at least different in length from each other, and the types of the amplifiers of the connection sources and the connection destinations. The alongside arrangement order selection unit may further include the alongside arrangement order calculation unit (40), the total length calculation unit (42), and the arrangement order determination unit (44). The alongside arrangement order calculation unit (40) calculates all of the alongside arrangement orders in which the plurality of the selected amplifiers are arranged adjacent to each other. The total length calculation unit (42) tentatively selects the type and the number of the bus bars that are used in each of all of the alongside arrangement orders, on the basis of the types of the amplifiers of the connection sources and the connection destinations that are stored in the storage unit. The total length calculation unit thereby determines the total length of the plurality of the bus bars that are used in each of all of the alongside arrangement orders. The arrangement order determination unit (44) determines, as the predetermined arrangement order, an alongside arrangement order that minimizes the total length of the bus bars that are used, from among all of the alongside arrangement orders. The accessory selection unit may select the type and the number of the bus bars based on the predetermined arrangement order. In accordance with such features, it can be easier to reduce the required number of the long bus bars.

The accessory selection unit may select, as the accessories, at least one of a breaker, a magnetic contactor, a fuse, a noise filter, a motor cable, an amplifier cable, a power transformer, or a lightning surge protector. In accordance with this feature, convenience for the operator can be achieved.

The input unit (22) through which the operator changes the predetermined arrangement order may be further provided, and in the case that the operator has changed the predetermined arrangement order, the accessory selection unit may reselect the type and the number of the accessories based on the predetermined arrangement order after having been changed. In accordance with this feature, convenience for the operator can be achieved.

The display control unit may cause the wiring diagram (46) showing the wiring configuration including at least one accessory, of the accessories, that has been selected and the plurality of the selected amplifiers to be displayed on the display unit together with the type of the at least one accessory that has been selected. In accordance with this feature, it becomes easier for the operator to grasp the wiring configuration.

Concerning each of the plurality of the motors (16), the storage unit may further store, in association with each other, the performance of the motor and the type of the amplifier that are able to drive the motors. The selection device may further be equipped with the motor selection unit and the amplifier selection unit (58). The motor selection unit selects the plurality of the designated motors from among the plurality of the motors that are stored in the storage unit, based on the performance and the required number of the motors that have been specified by the operator. The amplifier selection unit (58) selects the plurality of the selected amplifiers in order to drive the plurality of the designated motors selected by the motor selection unit, based on the corresponding relationship between the motors and the types of the amplifiers that are stored in the storage unit. The acquisition unit may acquire the plurality of the selected amplifiers selected by the amplifier selection unit. In accordance with such features, the selection device is provided, which not only selects the bus bars, but prior to making such a selection, also carries out the selection of the plurality of the designated motors, and the selection of the plurality of the selected amplifiers.

There may further be provided the external output unit (60) that externally outputs, as an order form to a manufacturer, one specified by the operator from among the plurality of the selected amplifiers, the plurality of the designated motors, and the accessories selected by the accessory selection unit. In accordance with this feature, for example, in the case that the bus bars or the accessories (refer to Modification 4) indicated in the selection results are insufficient, the operator can easily carry out placement of an order to the maker for the insufficient components.

The display control unit may further cause the detailed specifications of the plurality of the selected amplifiers and detailed specifications of the plurality of the designated motors to be displayed. In accordance with this feature, it becomes easy for the operator to confirm the detailed specifications of each of the selected amplifiers and the designated motors.

Second Invention

The selection method is a method for selecting the predetermined arrangement order of the plurality of the amplifiers (14). The selection method includes the storage step (S1), the acquisition step (S2), the alongside arrangement order selection step (S3), and the display step (S5). In the storage step (S1), the plurality of types of the amplifiers (14) are stored. In the acquisition step (S2), the plurality of the selected amplifiers (14) which are selected in order to drive the plurality of the designated motors (16) that have been designated in advance are acquired. In the alongside arrangement order selection step (S3), the predetermined arrangement order in which the plurality of the selected amplifiers are arranged adjacent to each other in the widthwise direction is selected, based on the types of the plurality of the selected amplifiers which are store in the storage step. In the display step (S5), the predetermined arrangement order is displayed on the display unit (20).

In accordance with such features, the selection method is provided that appropriately selects the order in which the plurality of the amplifiers are arranged alongside one another.

In the storage step, the plurality of types of the amplifiers and the widthwise length or the rated current of the amplifiers may be stored in association with each other. In the alongside arrangement order selection step, the alongside arrangement order may be determined as the predetermined arrangement order, on the basis of the widthwise length or the rated current of the amplifiers that is stored in the storage step. The above alongside arrangement order is an arrangement order in which the plurality of the selected amplifiers are arranged in order of the widthwise length or the rated current magnitude of the amplifiers. In accordance with such features, it can be easier to reduce the required number of the wide bus bars.

There may further be included the accessory selection step (S4) of selecting the type and the number of the accessories that are connected to the plurality of the selected amplifiers that are arranged in the predetermined arrangement order. One item concerning the accessories may be the bus bars (12) that connect the plurality of the amplifiers. In the storage step, the plurality of types of the bus bars, which have at least different lengths from each other, and the types of the amplifiers of the connection sources and the connection destinations may be stored in association with each other. The alongside arrangement order selection step may include the alongside arrangement order calculation step (S31), the total length calculation step (S32), and the arrangement order determination step (S33). In the alongside arrangement order calculation step (S31), all of the alongside arrangement orders in which the plurality of the selected amplifiers are arranged adjacent to each other are calculated. In the total length calculation step (S32), the type and the number of the bus bars that are used in each of all of the alongside arrangement orders are tentatively selected, on the basis of the types of the amplifiers of the connection sources and the connection destinations that are stored in the storage step. Thereby, the total length of the plurality of the bus bars that are used in each of all of the alongside arrangement orders is determined. In the arrangement order determination step (S33), the alongside arrangement order that minimizes the total length of the bus bars that are used, from among all of the alongside arrangement orders, is determined as the predetermined arrangement order. In accordance with such features, it can be easier to reduce the required number of the long bus bars.

The invention claimed is:

1. A selection device, comprising:
   a storage unit configured to store in advance a plurality of types of amplifiers;
   an acquisition unit configured to acquire a plurality of selected amplifiers which are selected in order to drive a plurality of designated motors that have been designated in advance;
   an alongside arrangement order selection unit configured to select a predetermined arrangement order in which the plurality of the selected amplifiers are arranged adjacent to each other in a widthwise direction, based on a type of the plurality of the selected amplifiers; and
   a display control unit configured to cause the predetermined arrangement order to be displayed on a display unit,
   wherein in a case where at least an arrangement order of the plurality of the selected amplifiers is undecided, alongside arrangement order selection unit selects the predetermined arrangement order.

2. The selection device according to claim 1, wherein:
   the storage unit stores, in association with each other, the plurality of types of the amplifiers, and a widthwise length or a rated current of the amplifiers; and
   the alongside arrangement order selection unit determines, as the predetermined arrangement order, an alongside arrangement order in which the plurality of the selected amplifiers are arranged in order of the widthwise length or a magnitude of the rated current of the amplifiers, based on the widthwise length or the rated current of the amplifiers that is stored in the storage unit.

3. The selection device according to claim 2, further comprising:
   an accessory selection unit configured to select a type and a number of accessories connected to the plurality of the selected amplifiers,
   wherein the storage unit further stores, in association with each other, the plurality of types of the amplifiers and a plurality of types of the accessories that are connectable to the amplifiers, and
   the accessory selection unit selects the type and the number of the accessories connected to the plurality of the selected amplifiers, based on the predetermined arrangement order and the type of the plurality of the selected amplifiers.

4. The selection device according to claim 3, wherein:
   one item concerning the accessories is a bus bar configured to connect the plurality of the amplifiers, and the bus bar comprises a plurality of types of bus bars;
   the storage unit stores, in association with each other, the plurality of types of the bus bars which are at least different in width from each other, and the types of the amplifiers of a connection source and a connection destination; and
   the accessory selection unit selects a type and a number of the bus bars in a manner so that width of the bus bars is as small as possible, based on the types of the amplifiers of the connection source and the connection destination.

5. The selection device according to claim 1, further comprising:
   an accessory selection unit configured to select a type and a number of accessories connected to the plurality of the selected amplifiers that are arranged in the predetermined arrangement order,
   wherein the storage unit further stores, in association with each other, the plurality of types of the amplifiers and a plurality of types of the accessories that are connectable to the amplifiers, and
   the accessory selection unit selects the type and the number of the accessories connected to the plurality of the selected amplifiers, based on the type of the plurality of the selected amplifiers.

6. The selection device according to claim 5, wherein:
   one item concerning the accessories is a bus bar configured to connect the plurality of the amplifiers, and the bus bar comprises a plurality of types of bus bars;
   the storage unit stores, in association with each other, the plurality of types of the bus bars which are at least different in length from each other, and the types of the amplifiers of a connection source and a connection destination;
   the alongside arrangement order selection unit further comprising:
   an alongside arrangement order calculation unit configured to calculate all of alongside arrangement orders in which the plurality of the selected amplifiers are arranged adjacent to each other;
   a total length calculation unit configured to tentatively select the type and the number of the bus bars that are used in each of all of the alongside arrangement orders, based on the types of the amplifiers of the connection source and the connection destination that are stored in the storage unit, and determine a total length of the bus bars that are used in each of all of the alongside arrangement orders; and an arrangement order determination unit configured to determine, as the predetermined arrangement order, an alongside arrangement order that minimizes the total length of the bus bars that are used, from among all of the alongside arrangement orders;

wherein the accessory selection unit selects the type and the number of the bus bars based on the predetermined arrangement order.

7. The selection device according to claim 3, wherein the accessory selection unit selects, as the accessories, at least one of a breaker, a magnetic contactor, a fuse, a noise filter, a motor cable, an amplifier cable, a power transformer, or a lightning surge protector.

8. The selection device according to claim 3, further comprising:

an input unit through which an operator changes the predetermined arrangement order, wherein, in a case that the operator has changed the predetermined arrangement order, the accessory selection unit reselects the type and the number of the accessories based on the predetermined arrangement order after having been changed.

9. The selection device according to claim 3, wherein the display control unit causes a wiring diagram showing a wiring configuration including at least one accessory, of the accessories, that has been selected and the plurality of the selected amplifiers to be displayed on the display unit together with the type of the at least one accessory that has been selected.

10. The selection device according to claim 3, further comprising an external output unit configured to externally output, as an order form to a manufacturer, one specified by the operator from among the plurality of the selected amplifiers, the plurality of the designated motors, and the accessories selected by the accessory selection unit.

11. The selection device according to claim 1, wherein:

the storage unit further stores, in association with each other, a performance of each of a plurality of motors and each of the types of the amplifiers that are able to drive the motors; and the selection device further comprises:

a motor selection unit configured to select the plurality of the designated motors from among the plurality of the motors that are stored in the storage unit, based on a performance and a required number of the motors that have been specified by an operator; and an amplifier selection unit configured to select the plurality of the selected amplifiers in order to drive the plurality of the designated motors selected by the motor selection unit, based on a corresponding relationship between the motors and the types of the amplifiers that are stored in the storage unit;

wherein the acquisition unit acquires the plurality of the selected amplifiers selected by the amplifier selection unit.

12. The selection device according to claim 1, wherein the display control unit further causes detailed specifications of the plurality of the selected amplifiers and detailed specifications of the plurality of the designated motors to be displayed.

13. A selection method comprising:

a storage step of storing a plurality of types of amplifiers;

an acquisition step of acquiring a plurality of selected amplifiers which are selected in order to drive a plurality of designated motors that have been designated in advance;

an alongside arrangement order selection step of selecting a predetermined arrangement order in which the plurality of the selected amplifiers are arranged adjacent to each other in a widthwise direction, based on a type of the plurality of the selected amplifiers which is stored in the storage step; and a display step of causing the predetermined arrangement order to be displayed on a display unit, wherein in a case where at least an arrangement order of the plurality of the selected amplifiers is undecided, the predetermined arrangement order is selected in the alongside arrangement order selection step.

14. The selection method according to claim 13, wherein:

in the storage step, the plurality of types of the amplifiers and a widthwise length or a rated current of the amplifiers are stored in association with each other; and in the alongside arrangement order selection step, an alongside arrangement order in which the plurality of the selected amplifiers are arranged in order of the widthwise length or a magnitude of the rated current of the amplifiers is determined as the predetermined arrangement order, based on the widthwise length or the rated current of the amplifiers that is stored in the storage step.

15. The selection method according to claim 13, further comprising:

an accessory selection step of selecting a type and a number of accessories that are connected to the plurality of the selected amplifiers that are arranged in the predetermined arrangement order;

one item concerning the accessories is a bus bar configured to connect the plurality of the amplifiers, and the bus bar comprises a plurality of types of bus bars;

in the storage step, the plurality of types of the bus bars which are at least different in length from each other, and the types of the amplifiers of a connection source and a connection destination are stored in association with each other; and the alongside arrangement order selection step comprises:

an alongside arrangement order calculation step of calculating all of alongside arrangement orders in which the plurality of the selected amplifiers are arranged adjacent to each other;

a total length calculation step of tentatively selecting the type and the number of the bus bars that are used in each of all of the alongside arrangement orders, based on the types of the amplifiers of the connection source and the connection destination that are stored in the storage step, and determining a total length of the bus bars that are used in each of all of the alongside arrangement orders; and an arrangement order determination step of determining, as the predetermined arrangement order, an alongside arrangement order that minimizes the total length of the bus bars that are used, from among all of the alongside arrangement orders.

16. The selection device according to claim 1, wherein in a case where at least an arrangement order of the plurality of the selected amplifiers is undecided, the alongside arrangement order selection unit selects the predetermined arrangement order.

\* \* \* \* \*